a12) United States Patent
Lin et al.

(10) Patent No.: US 7,536,750 B2
(45) Date of Patent: May 26, 2009

(54) MULTI-SECTION HINGE MECHANISM (75) Inventors: Chun-Jen Lin, Tu-Cheng (TW); Yan Liu, Shenzhen (CN)

(73) Assignees: ShenZhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 358 days.

(21) Appl. No.: 11/143,532

(22) Filed: Jun. 2, 2005

(65) Prior Publication Data

US 2005/0278894 A1 Dec. 22, 2005

(30) Foreign Application Priority Data

Jun. 18, 2004 (TW) ............... 93209684 U (51) Int. Cl.
*E05D 11/10* (2006.01)
(52) U.S. Cl. ............... 16/334; 379/433.12; 16/327; 16/321
(58) Field of Classification Search .......... 16/334, 16/335, 336, 327, 321; 379/433.12, 433.13
See application file for complete search history.

(56) References Cited

U.S. PATENT DOCUMENTS 4,718,127 A * 1/1988 Rittmann et al. ............ 2/424
5,109,572 A * 5/1992 Park ..................... 16/334
6,609,273 B1 * 8/2003 Yamada et al. ............ 16/332
7,027,845 B2 * 4/2006 Sudo ..................... 455/575.1
7,117,562 B2 * 10/2006 Zuo et al. .................. 16/303
7,168,133 B2 * 1/2007 Luo et al. .................. 16/303
7,237,304 B2 * 7/2007 Duan et al. ................ 16/324
7,251,859 B2 * 8/2007 Oshima et al. ............. 16/330
2002/0187818 A1 12/2002 Kang
2004/0051779 A1 3/2004 Tatchana et al.

FOREIGN PATENT DOCUMENTS

CN 02122769.1 1/2003
CN 02801997.0 12/2003

* cited by examiner

*Primary Examiner*—Victor Batson
*Assistant Examiner*—David C Reese (57) ABSTRACT

A multi-section hinge mechanism (60) includes a rotary member (10), a connecting shaft (20) and a hollow cylindrical body (30). The rotary member includes a disk (11) and a securing portion (12) integrally formed with the disk. The connecting shaft includes a shaft portion (22) and an elastic body (23) provided on the shaft portion. The hollow cylindrical body includes a bottom portion (31) and defining a plurality of grooves (33) in an inner wall thereof. The bottom portion defines a hole (32). The shaft portion is rotatably received in the hole. The shaft portion of the connecting shaft is securely engaged with the securing portion of the rotary member. The elastic body engages in one of the grooves of the cylindrical body.

14 Claims, 8 Drawing Sheets

MULTI-SECTION HINGE MECHANISM

FIELD OF THE INVENTION

The present invention relates to hinge mechanisms, and particularly to a multi-section hinge mechanism used in foldable electronic devices such as mobile telephones, electronic notebooks, and so on.

BACKGROUND OF THE INVENTION

With the development of the technologies of wireless communication and information processing, portable electronic devices such as mobile telephones and electronic notebooks are now in widespread use. These electronic devices enable consumers to enjoy the convenience of high technology services anytime and anywhere. Foldable electronic devices are particularly favored by consumers for their convenience.

Generally, a foldable electronic device has most of the electronics in one housing, called the body. The other housing, called the cover, normally contains fewer electronic components than the body. Other foldable electronic devices have all the electronics in the body, with the cover containing no electronics. Various types of hinge mechanisms are used to join a body and a cover of a foldable electronic device, so that the cover can unfold up from and fold down upon the body. Nowadays, hinge mechanisms with one or more springs are preferred by many users. Although suitable for some foldable radiotelephones, a hinge mechanism with a spring is not suitable for certain miniaturized foldable radiotelephones. This is because the housing of a miniaturized radiotelephone may not have sufficient bulk to sturdily withstand the forces generated from the spring. If so, it is necessary to increase the size of the housing so that it has sufficient bulk to withstand the forces generated from the spring. This in effect increases the longitudinal size of the hinge mechanism, thus increasing the overall volume of the foldable electronic device.

Further, with the development of the technologies of video, image and vocal communications, foldable electronic devices having cameras installed therein have become popular. Photographic image data obtained by the camera can be transmitted by the foldable electronic device in real time. The camera may be mounted in a main body or in a cover of the foldable electronic device. Alternatively, the camera may be mounted in the hinge mechanism installed between the body and the cover. This enables the camera to be rotated within a range of angles, in order to conveniently point the camera in different directions to take desired photographs.

One kind of foldable electronic device with a camera is described in U.S. patent application Ser. No. 2004/0051779 published on Mar. 18, 2004. The foldable electronic device has a lower case, an upper case, and a hinge mechanism. The hinge mechanism includes a hinge part, a photographing part rotatably mounted in the hinge part, and an association mechanism. The association mechanism has a connecting member. The connecting member holds the photographing part so as to rotate about the hinge part and to rotate the photographing part integrally with the upper case. However, the photographing part cannot rotate independently from the upper case, and thus cannot rotate to and be oriented in any desired direction.

Figure 8:
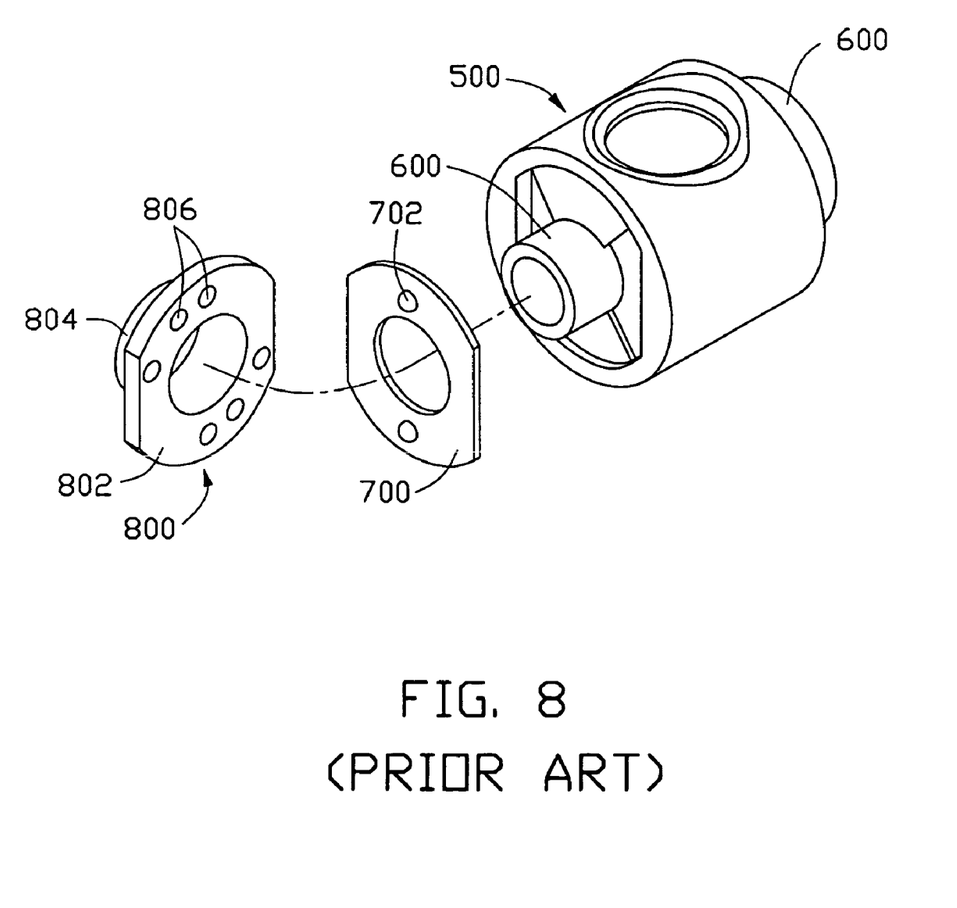
FIG. 8 is an exploded, isometric view of a conventional hinge mechanism.

Another kind of foldable electronic device with a camera is described in U.S. patent application Ser. No. 2002/0187818 published on Dec. 12, 2002. Referring to FIG. 8, a mobile phone includes a camera module 500 and a hinge mechanism (not labeled). The hinge mechanism includes a rotation axle 600, an elastic sub-part 700, and a bushing 800. The elastic sub-part 700 is essentially plate-shaped, with a central through hole. A pair of opposite protrusions 702 extends from the elastic sub-part 700 toward the bushing 800. The bushing 800 has a contacting part 802 and a boss 804. The contacting part 802 defines a plurality of grooves 806 corresponding to the protrusions 702. In the illustration, there are six grooves 806. The rotation axle 600 passes through the through hole of the elastic sub-part 700 and the bushing 800, and the elastic sub-part 700 is fixed in the camera module 500. The rotation of the camera module 500 can be achieved via the connection between the camera module 500 and the elastic sub-part 700, the engagement of the protrusions 702 in selected of the grooves 806, and action of the rotation axle 600. The hinge mechanism can achieve rotation to and orientation in different desired angles. However, there are numerous elements, which increases the space occupied by the hinge mechanism. In addition, after repeated use, the connection between the camera module 500 and the elastic sub-part 700 is liable to weaken. The elastic sub-part 700 may even separate from the camera module 500, resulting in failure of the hinge mechanism. Furthermore, the rotation mechanism is not modularized, and therefore is unsuited for efficient mass production.

What is needed, therefore, is a hinge mechanism which has a relatively simple and small modularized configuration, and which can rotate to any of various desired angles so that a camera therein can be oriented in a desired direction.

SUMMARY

A multi-section hinge mechanism is provided. In a preferred embodiment, a multi-section hinge mechanism according to the present invention comprises a rotary member, a connecting assembly and a hollow cylindrical. The rotary member includes a disk and a securing portion integrally formed with the disk. The connecting assembly includes a shaft portion and an elastic body provided on the shaft portion. The hollow cylindrical body includes a bottom portion and defining a plurality of grooves in an inner wall thereof. The bottom portion defines a hole. The shaft portion is rotatably received in the hole. The elastic body engaged in one of the grooves in the cylindrical body.

A main advantage of the hinge mechanism is that has only three main components, and occupies a relatively small volume. Accordingly, the space required in an application such as a camera rotating mechanism or a mobile phone is reduced. In addition, the hinge mechanism can achieve rotation to any of various different angles and thus be stably aimed in a desired direction. Furthermore, the hinge mechanism is modularized, which makes it convenient to use in mass production assembly of foldable electronic devices such as mobile phones.

A camera rotating mechanism for a foldable electronic device is provided. In a preferred embodiment, a camera rotating mechanism comprises a hollow fastener, a multi-section hinge mechanism. The fastener includes a partly closed end, the partly closed end defining an opening. A locking portion is provided on the partly closed end and around the opening. The multi-section hinge mechanism includes a rotary member, a connecting assembly and a hollow cylindrical. The rotary member includes a disk and a securing portion integrally formed with the disk. The connecting assembly includes a shaft portion and an elastic body provided on the shaft portion. The hollow cylindrical body includes a bottom portion and defining a plurality of grooves in an inner wall thereof. The bottom portion defines a hole. The shaft portion is rotatably received in the hole. The elastic body engaged in one of the grooves in the cylindrical body.

The securing portion of the rotary member runs through the opening of the fastener and engages with the locking portion of the fastener.

A main advantage of the camera rotating mechanism is that has only as few as four main components, and occupies a relatively small volume. Accordingly, the space required in an application such as a foldable electronic device is reduced. In addition, the camera rotating can make a camera mounted on the camera rotating mechanism to rotate within any desired angle and orient stably in any desired direction. Therefore the camera can photograph any different object in all direction and also improve the quality of image photographed.

Other objects, advantages and novel features will become more apparent from the following detailed description when taken in conjunction with the accompanying drawings, in which:

DETAILED DESCRIPTION OF PREFERRED EMBODIMENTS

Figure 3:
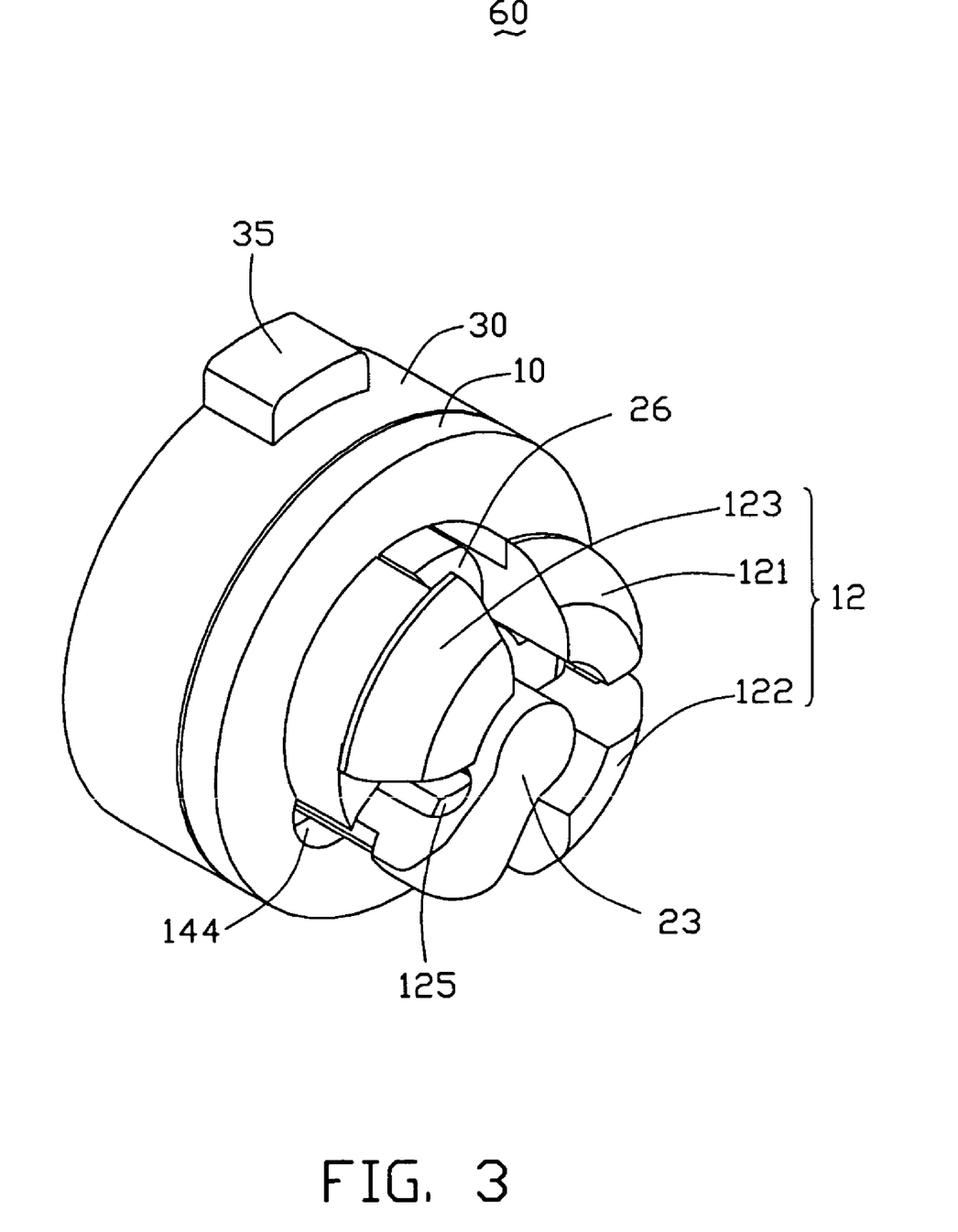
FIG. 3 is an assembled view of the multi-section hinge mechanism of FIG. 1.

FIG. 3 shows a multi-section hinge mechanism 60 according to a first preferred embodiment of the present invention. The multi-section hinge mechanism 60 can be used to support a component like a camera, such that the camera can be freely moved to a desired angle and stably aimed in a desired direction for taking a photograph. The multi-section hinge mechanism 60 also can be used to interconnect components like a body (not shown) and a cover (not shown) of a foldable electronic device. The multi-section hinge mechanism 60 includes a rotary member 10, a connecting shaft 20 defining a central axis of the hinge mechanism 60, and a cylindrical body 30. The rotary member 10 and the cylindrical body 30 are located around the connecting shaft 20, respectively.

Figure 1:
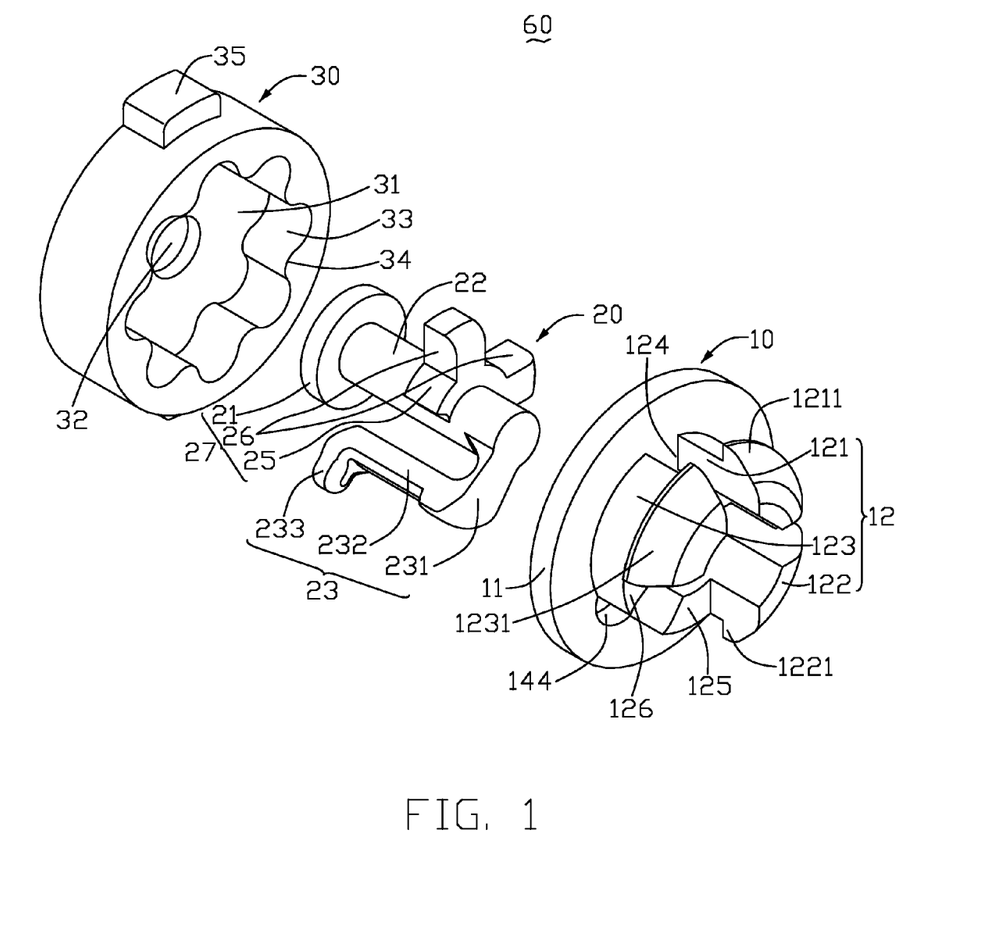
FIG. 1 is an exploded, isometric view of a multi-section hinge mechanism according to a first preferred embodiment of the present invention.
Figure 2:
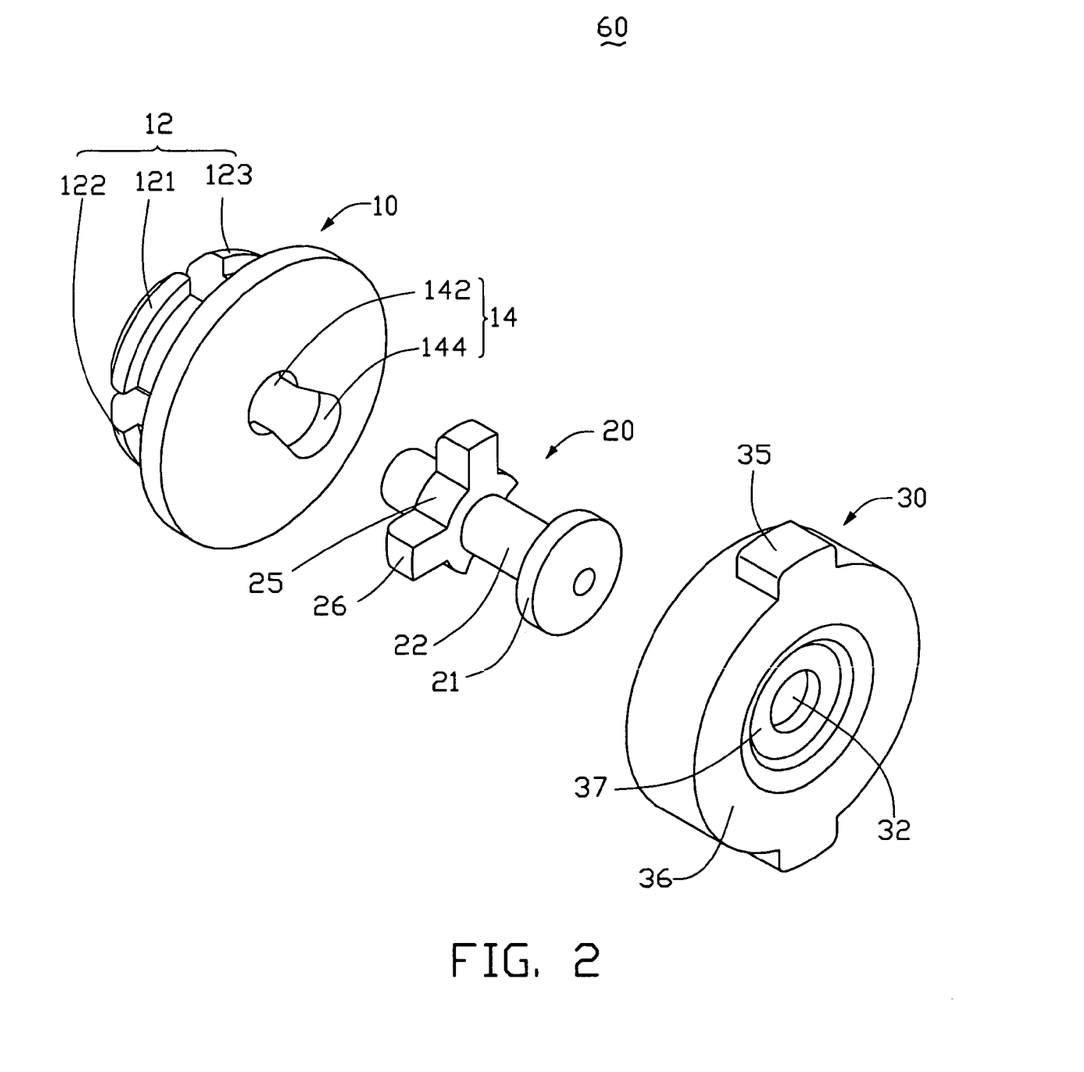
FIG. 2 is similar to FIG. 1, but viewed from a reverse aspect.

Also referring to FIGS. 1-2, the rotary member 10 includes a disk 11, a crosshead 12 as a securing portion, and a through hole 14 running through the disk 11 and the crosshead 12. The crosshead 12 extends perpendicularly from one end surface of the disk 11, and is integrally formed with the disk 11. The crosshead 12 includes a first jaw 121, a second jaw 122 and a third jaw 123, all of which are spaced from each other. The first jaw 121, the second jaw 122 and the third jaw 123 are provided on a same circumference, and cooperatively define a circular receiving space (not labeled). The first, second and third jaws 121, 122, 123 respectively include head portions 1211, 1221, 1231. The head portions 1211, 1221, 1231 are each substantially in an arcuate shape. An outer diameter cooperatively defined by the head portions 1211, 1221; 1231 is larger than a corresponding outer diameter of a stem region of the crosshead 12 between the disk 11 and the head portions 1211, 1221, 1231. Two first receiving spaces 124 are respectively defined between the first jaw 121 and the second jaw 122, and between the first jaw 121 and the third jaw 123. A first convex stage 125 is provided adjacent the second jaw 122, and a second convex stage 126 is provided adjacent the third jaw 123. A second receiving space (not labeled) is defined between the first convex stage 125 and the second convex stage 126. The through hole 14 comprises a round hole 142 and an arc hole 144. The round hole 142 communicates with the arc hole 144. The arc hole 144 is generally located between the first convex stage 125 and the second convex stage 126, and communicates with the second receiving space.

The connecting shaft 20 may be made of plastic material. The connecting shaft 20 includes a flange 21, a shaft portion 22, and an elastic arm 23. The shaft portion 22 is sized such that it can pass through the round hole 142 of the rotary member 10. The flange 21 is provided at one end of the shaft portion 22, and is securely connected with the shaft portion 22 by melting. The elastic arm 23 extends transversely from the other end of the shaft portion 22, and is integrally formed with the shaft portion 22. The elastic arm 23 includes a connecting portion 231, an elastic portion 232, and a bent portion 233. The connecting portion 231 extends transversely from said other end of the shaft portion 22. The elastic portion 232 is parallel with the shaft portion 22. The bent portion 233 is oriented perpendicular to the elastic portion 232 and parallel with the connecting portion 231. An end surface of the bent portion 233 is arcuate. The connecting portion 231 is received in the second receiving space of the rotary member 10. The elastic portion 232 and the bent portion 233 can pass through the arc hole 144 of the rotary member 10. The connecting shaft 20 further includes an arcuate projection 25, which integrally protrudes from a middle part of the shaft portion 22. Two blocks 26 that function as locking projections are provided on the arcuate projection 25, and are spaced apart from each other. The blocks 26 are respectively received in the first receiving spaces 124. The flange 21, the arcuate projection 25, and the two blocks 26 cooperatively from a locking mechanism 27. The locking mechanism 27 is formed on the shaft portion 22 and configured for securely engaging with the cross head 12 of the rotary member 10 and the cylindrical body 30.

The cylindrical body 30 is hollow, and is made of plastic material. The cylindrical body 30 includes an open end (not labeled) and an end wall 31. An outer diameter of the cylindrical body 30 is the same as an outer diameter of the disk 11 of the rotary member 10. The end wall 31 defines a round hole 32 running therethrough. A diameter of the round hole 32 is the same as or slightly larger than a diameter of the shaft portion 22 of the connecting shaft 20, such that the shaft portion 22 can extend through the round hole 32. A plurality of regularly spaced arcuate grooves 33 is defined in an inner circumferential surface portion of the cylindrical body 30. A plurality of arcuate protrusions 34 is thus defined between each two adjacent arcuate grooves 33. A shape of each arcuate groove 33 corresponds to the shape of the end surface of the bent portion 233. Thus the bent portion 233 can fittingly engage in any of the arcuate grooves 33. The cylindrical body 30 further includes two arcuate projections 35 which function as fixing projections, and which are symmetrically provided on an outer circumferential surface of the cylindrical body 30.

A stepped groove 37 is defined in an end surface 36 of the end wall 31, for receiving the flange 21 of the connecting shaft 20.

Referring to FIG. 3, in assembly of the multi-section hinge mechanism 60, firstly, the connecting shaft 20 without the flange 21 is provided. The connecting shaft 20 is mounted into the rotary member 10 from the crosshead 12 side thereof. The shaft portion 22 and the elastic arm 23 of the connecting shaft 20 respectively pass through the round hole 142 and the arc hole 144. The blocks 26 of the arcuate projection 25 are respectively received and locked in the first receiving spaces 124, and the connecting portion 231 and the elastic portion 232 of the elastic arm 23 are received and locked in the second receiving space. Thus, the connecting shaft 20 is securely connected with the rotary member 10. Then the cylindrical body 30 is fitted around the connecting shaft 20, with the round hole 32 receiving the shaft portion 22. Eventually, the bent portion 233 of the connecting shaft 20 engages in one of the arcuate groove 33, and the disk 11 of the rotary member 10 abuts the open end of cylindrical body 30. Lastly, the flange 21 is fixed onto said one end of the shaft portion 22 by melting, and is received in the stepped groove 37.

In use of the multi-section hinge mechanism 60, the cylindrical body 30 may be fixed to a first body via the arcuate projections 35. The rotary member 10 may be fixed to a second body via the crosshead 12. The rotary member 10 is manually rotated by a user. Rotation of the rotary member 10 causes the connecting shaft 20 to rotate in unison, because of the fixed connection between the rotary member 10 and the connecting shaft 20. Hence, the elastic arm 23 of the connecting shaft 20 rotates relative to the cylindrical body 30. Accordingly, the bent portion 233 of the elastic arm 23 rotates out from the arcuate groove 33 to an adjoining arcuate protrusion 34 adjacent the arcuate groove 33. At this time, the elastic arm 23 of the connecting shaft 20 is in an elastically deformed state, with the bent portion 233 pressing on the arcuate protrusion 34 of the cylindrical body 30. Once the bent portion 233 has ridden past a peak of the arcuate protrusion 34, the elastic force exerted by the elastic arm 23 drives the bent portion 233 to move from the arcuate protrusion 34 and enter the adjacent arcuate groove 33. The bent portion 233 thus becomes stably locked in the adjacent arcuate groove 33. Further, the above-described process can be repeated a desired number of times according to the user's requirement, with the bent portion 233 finally settling in a desired one of the arcuate grooves 33. That is, the rotary member 10 can be rotated to any of various angles needed for the user's requirement.

Figure 4:
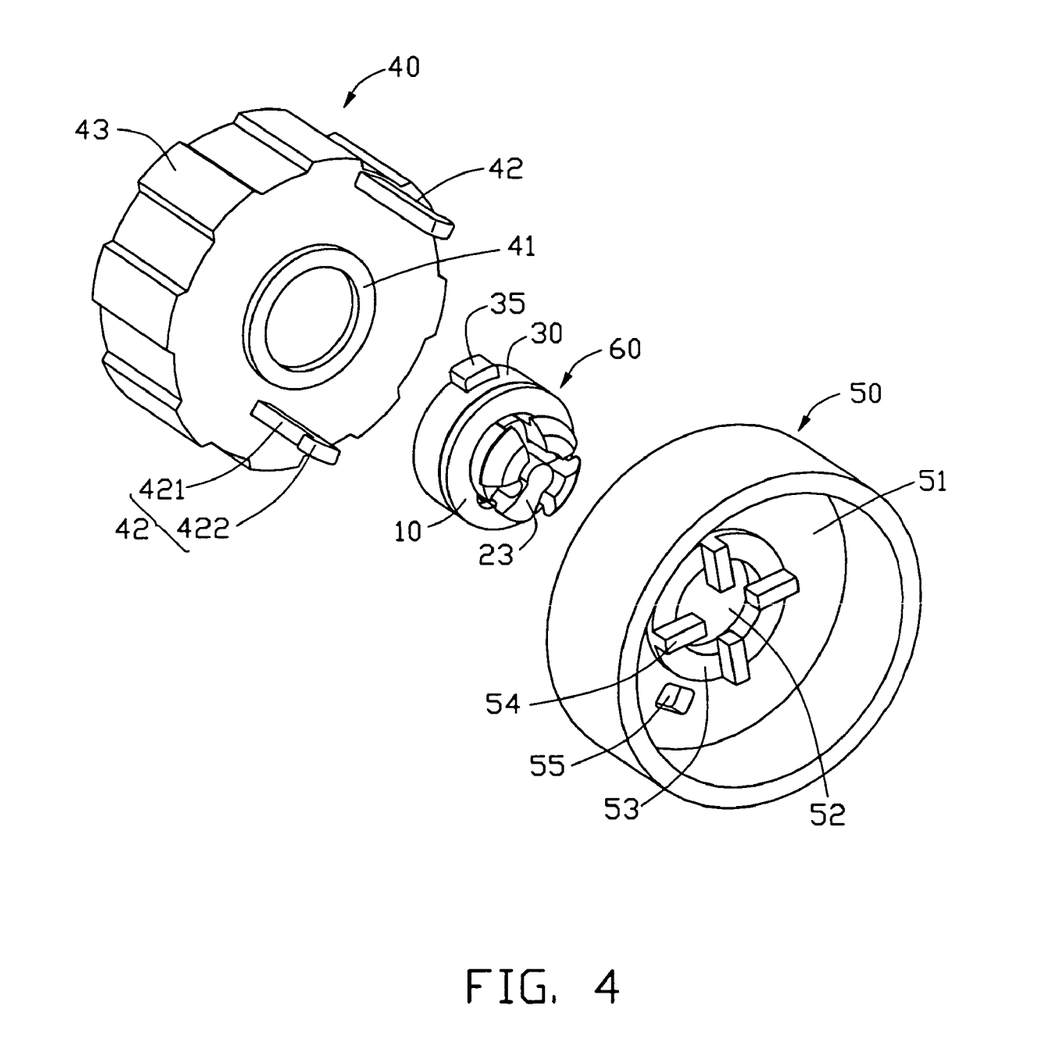
FIG. 4 is an exploded, isometric view of a camera rotating mechanism in which the multi-section hinge mechanism of FIG. 1 is applied.

Referring to FIG. 4, a camera rotating mechanism to which the multi-section hinge mechanism 60 can be applied is shown. The camera rotating mechanism further includes an operating member 40 and a fastener 50. A camera (not shown) can be mounted in the fastener 50.

The operating member 40 can be cylindrical. The operating member 40 includes an annular projection 41 extending from one end surface thereof, and two parallel locking posts 42 extending from opposite sides of the end surface respectively. An inner diameter of the annular projection 41 is slightly larger than a diameter of the flange 21 of the connecting shaft 20, so that the annular projection 41 can be engaged with the flange 21. Further, the annular projection 41 can be received in the stepped groove 37 of the cylindrical body 30. Each locking post 42 includes a post portion 421 and a distal locking portion 422. The operating member 40 includes a plurality of longitudinal projections 43 provided on an outer circumferential surface thereof, for facilitating manual operation of the operating member 40.

The fastener 50 is a hollow cylinder. The fastener 50 includes an open end (not labeled) and a partly closed end 51. The partly closed end 51 defines a circular opening 52 in a middle thereof. A diameter of the circular opening 52 is slightly larger than the diameter of the stem region of the crosshead 12 between the disk 11 and the head portions 1211, 1221, 1231. The diameter of the circular opening 52 is less than a corresponding largest diameter of the head portions 1211, 1221, 1231. An annular protrusion 53 is provided on an inside of the partly closed end 51, around the circular opening 52. Four quadrate blocks 54 serving as locking means are symmetrically provided on a distal end surface of the annular protrusion 53. Each quadrate block 54 extends from a circumferential edge of the annular protrusion 53 toward a central axis of the fastener 50, and protrudes beyond an inner edge of the annular protrusion 53. An interval (not labeled) is defined between each two adjacent quadrate blocks 54. The partly closed end 51 defines two symmetrically opposite rectangular openings 55, for engagingly receiving the locking posts 42.

Figure 5:
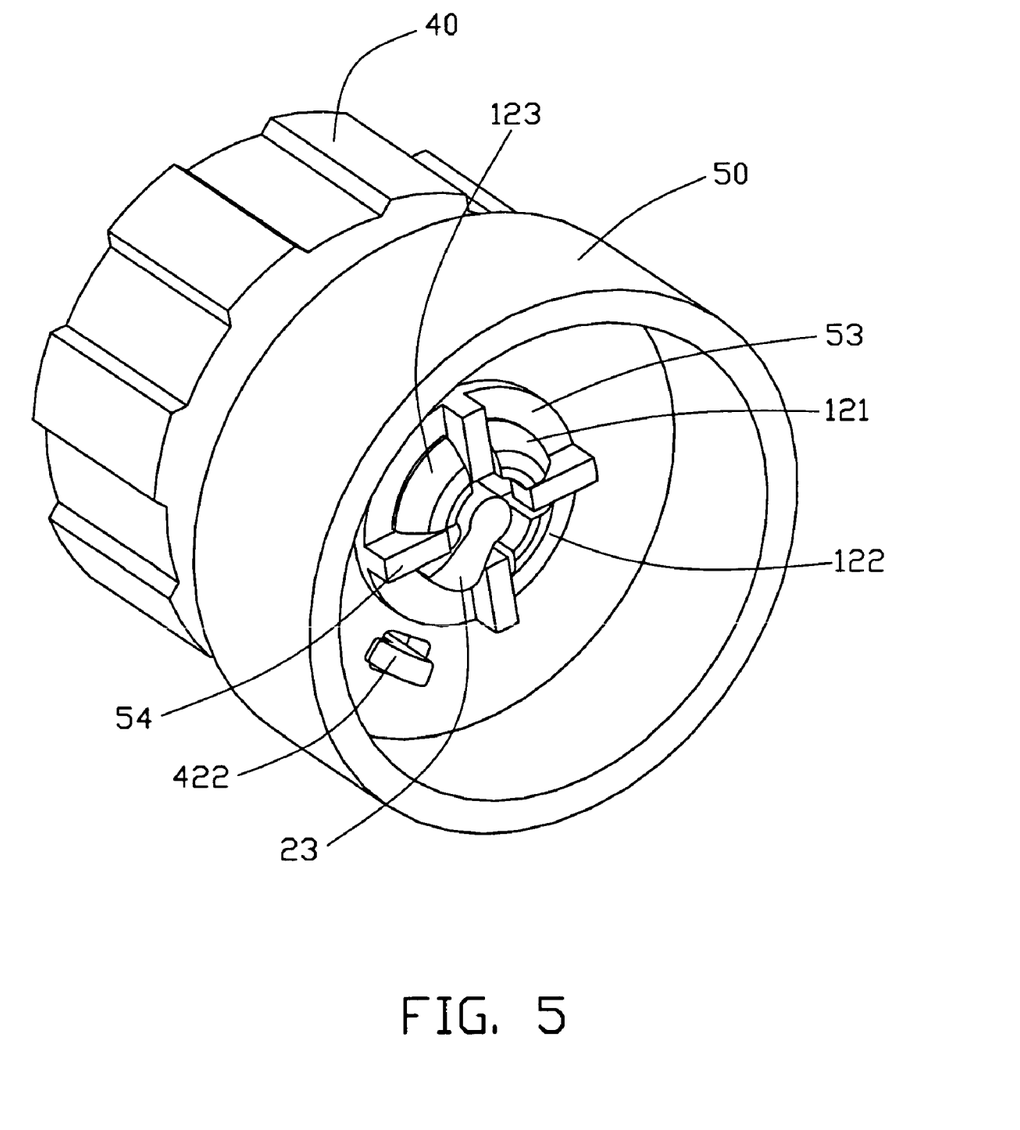
FIG. 5 is an enlarged, assembled view of the camera rotating mechanism of FIG. 4.

Referring to FIG. 5, in assembly of the camera rotating mechanism, the jaws 121, 122, 123 of the rotary member 10 are pressed into the circular opening 52 of fastener 50, so that the jaws 121, 122, 123 elastically deform inwardly. The jaws 121, 122, 123 are thus snappingly received and locked in three corresponding intervals between the quadrate blocks 54, with the elastic arm 23 of the connecting shaft 22 being received and locked in the other interval between the quadrate blocks 54. That is, the quadrate blocks 54 fittingly engage with the crosshead 12 and the elastic arm 23 of the connecting shaft 20, with the head portions 1211, 1221, 1231 abutting the distal end surface of the circular protrusion 53. The multi-section hinge mechanism 60 is thus securely connected with the fastener 50 via the rotary member 10.

Figure 6:
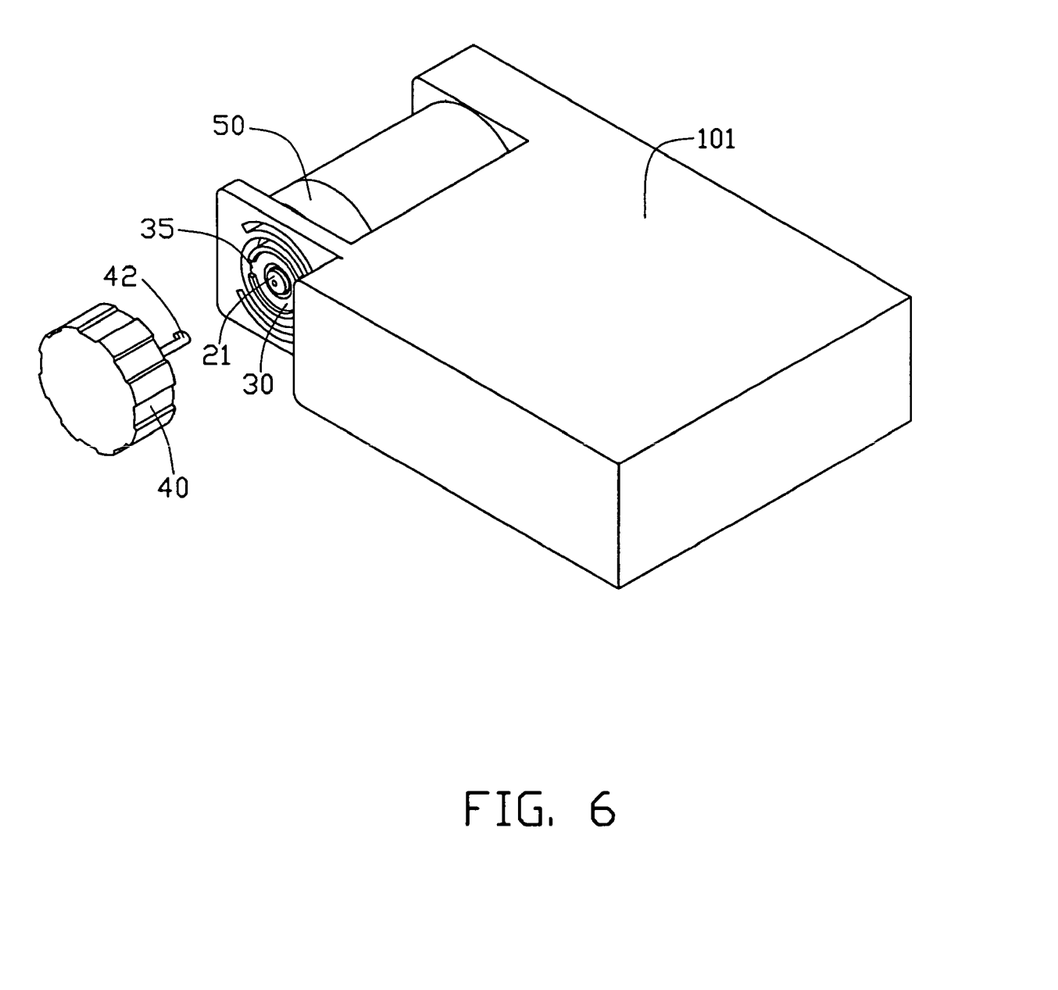
FIG. 6 is an exploded, isometric view of the camera rotating mechanism of FIG. 5 incorporated in a mobile phone, but only showing part of the mobile phone.

Referring to FIG. 6, the camera rotating mechanism can be assembled in a foldable electronic device such as a mobile phone (partly shown). The fastener 50 is secured in a cover (not shown) of the mobile phone via the four quadrate blocks 54, and the cylindrical body 30 of the multi-section hinge mechanism 60 is secured in a body 101 of the mobile phone via the arcuate projections 35. Then, the locking posts 42 of the operating member 40 are extended through the rectangular openings 55 and are snappingly locked therein, with the locking portions 422 abutting the inside of the partly closed end 51. Thus the operating member 40 is fixed to the fastener 50, such that they can only rotate in unison.

In operation of the foldable electronic device, the operating member 40 is manually rotated, which drives the fastener 50 to rotate correspondingly. The fastener 50 thus drives the rotary member 10 of the multi-section hinge mechanism 60 to rotate correspondingly. Because the rotary member 10 can rotate to any of various angles relative to the cylindrical body 30, the fastener 50 can be rotated to a desired angle relative to the cylindrical body 30. That is, the camera mounted in the fastener 50 can be rotated to a desired angle and stably aimed in a desired direction relative to the body 101 of the mobile phone.

Figure 7:
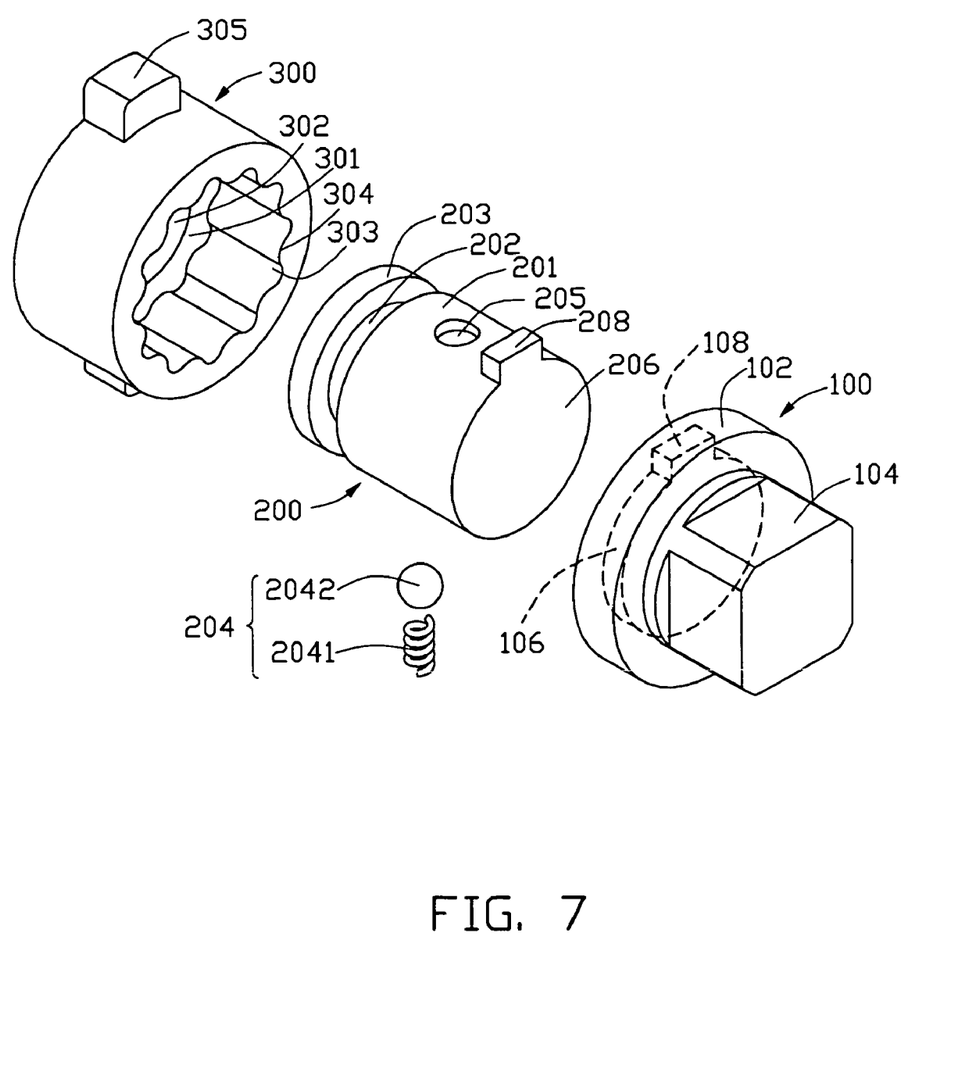
FIG. 7 is an exploded, isometric view of a multi-section hinge mechanism according to a second preferred embodiment of the present invention.

Referring to FIG. 7, a multi-section hinge mechanism according to a second preferred embodiment of the present invention is shown. The multi-section hinge mechanism includes a rotary member 100, a connecting assembly 200, and a cylindrical body 300.

The rotary member 100 includes a disk 102 and a securing portion 104. The disk 102 defines an irregular groove (not labeled). The irregular groove comprises a round recess 106 and a quadrate recess 108. The securing portion 104 is substantially a short, four-sided block. The disk 102 and the securing portion 104 are integrally formed.

The connecting assembly 200 includes a first shaft portion 201, a second shaft portion 202, a flange 203, and an elastic assembly 204. The elastic assembly 204 includes a spring 2041 and a ball 2042. The flange 203 is provided at one end of the second shaft portion 202, and is secured on the second shaft portion 202 by melting. The first shaft portion 201 defines a blind hole 205 in a circumferential wall thereof. The spring 2041 is received in the blind hole 205. One end of the spring 2041 abuts a bottom wall in the blind hole 205, and the other end of the spring 2041 is joined to the ball 2042. In particular, the other end of the spring 2041 can be securely joined to the ball 2042 by melting. A girth of the ball 2042 is larger than a diameter of the topmost portion of the blind hole 205. A top portion of the ball 2042 is contained in and protrudes out from the topmost portion of the blind hole 205. The connecting assembly 200 further includes a quadrate projection 208 extending radially outwardly from an end portion 206 of the first shaft portion 201. The end portion 206 and the quadrate projection 208 of the first shaft portion 201 are respectively received in the round recess 106 and the quadrate recess 108.

The cylindrical body 300 is substantially a hollow cylinder, and is made of plastic material. The cylindrical body 300 includes an open end (not labeled) and an end wall 301. An outer diameter of the cylindrical body 300 is the same as an outer diameter of the disk 102 of the rotary member 100. The end wall 301 defines a round hole 302 therethrough. A diameter of the round hole 302 is slightly larger than a diameter of the second shaft portion 202 of the connecting assembly 200. A plurality of regularly spaced arcuate grooves 303 is defined in an inner circumferential surface portion of the cylindrical body 300. A plurality of arcuate protrusions 304 is thus defined between each two adjacent arcuate grooves 303. A shape of each arcuate groove 303 corresponds to the shape of the ball 2042. Thus the ball 2042 can fittingly engage in any of the arcuate grooves 303. The cylindrical body 300 further includes two arcuate projections 305 which function as fixing projections, and which are symmetrically provided on an outer circumferential surface of the cylindrical body 300. A stepped groove (not shown) is defined in an outer surface portion of the end wall 301, for receiving the flange 203 of the connecting assembly 200.

In assembly of the multi-section hinge mechanism, firstly, the connecting assembly 200 without the flange 203 is provided. The spring 2041 is connected with the ball 2042 by melting. The combined spring 2041 and ball 2042 is received in the blind hole 205, with one end of the spring 2041 abutting the bottom wall in the blind hole 205. The top portion of the ball 2042 is contained in and protrudes out from the blind hole 205. Therefore the ball 2042 is adapted to always abut the cylindrical body 300 in one of the arcuate grooves 303 or on one of the arcuate protrusions 304 under the elastic force of the spring 2041. Then the end portion 206 and the quadrate projection 208 of the first shaft portion 201 are received and locked in the round recess 106 and the quadrate recess 108 of the rotary member 100 respectively. Then the cylindrical body 300 is fitted around the connecting assembly 200, with the round hole 302 receiving the second shaft portion 202. Eventually, the ball 2042 engages in one of the arcuate grooves 303, and the disk 102 of the rotary member 100 abuts the open end of the cylindrical body 300. Lastly, the flange 203 is fixed onto the second shaft portion 202 by melting, and is received in the stepped groove of the cylindrical body 300.

In use of the multi-section hinge mechanism, the cylindrical body 300 may be fixed to a first body via the arcuate projections 305. The rotary member 100 may be fixed to a second body via the securing portion 104. The rotary member 100 is manually rotated by a user. Rotation of the rotary member 100 causes the connecting assembly 200 to rotate in unison, because of the fixed connection between the rotary member 100 and the connecting assembly 200. Hence, the ball 2042 rotates relative the cylindrical body 300, out from the arcuate groove 303 to an adjoining arcuate protrusion 304 adjacent the arcuate groove 303. In this position, the spring 2041 is further compressed. Once the ball 2042 has ridden past a peak of the arcuate protrusion 304, the elastic force exerted by the spring 2041 drives the ball 2042 to move from the arcuate protrusion 304 and enter the adjacent arcuate groove 303. The ball 2042 thus becomes stably locked in the adjacent arcuate groove 303. Further, the above-described process can be repeated a desired number of times according to the user's requirement, with the ball 2042 finally settling in a desired one of the arcuate grooves 303. That is, the rotary member 100 can be rotated to any of various angles needed for the user's requirement.

In alternative embodiments, the flanges 21, 203 of the connecting shaft 20 and the connecting assembly 200 can be riveted to the connecting shaft 20 and the connecting assembly 200 respectively, instead of using melting. The round holes 32, 302 can have other shapes. The operating member 40 can be omitted. Instead, in one example, if the fastener 50 is secured to a cover of a mobile phone, the cover can be rotated manually. Because the fastener 50 is secured to the cover, the fastener 50 is driven to rotate to the desired angle.

The multi-section hinge mechanism can be used not only in a camera rotating mechanism of a foldable electronic device to achieve rotation and orientation of a camera to a desired angle, but also in a foldable electronic device to connect a main body and a cover thereof and achieve rotation and orientation of the cover relative to the main body. The rotary member 10, 100 is secured in the cover via the crosshead 12 or the securing portion 104. The cylindrical body 30, 300 is secured in the main body via the arcuate projections 35, 305. The cover is folded down or unfolded up from the main body via the rotating member 10, 100 rotating about the cylindrical body 30, 300.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A multi-section hinge mechanism comprising:
   a rotary member including a disk and a securing portion integrally formed with the disk;
   a connecting shaft comprising a shaft portion having a surface and first and second ends, a cantilevered elastic arm having an attaching portion protruding from the surface at one end of the shaft portion, and a locking mechanism extending from the shaft portion, the locking mechanism comprising an arcuate projection and a locking projection, the arcuate projection being formed on the shaft portion, and the locking projection being formed on the arcuate projection; and
   a hollow cylindrical body defining a plurality of grooves in an inner wall thereof and a hole therethrough, the shaft portion engaging in the hole and being rotatable therein, the elastic arm rotatable with the shaft portion and engaging in one of the grooves;
   wherein the locking mechanism is configured for securely engaging with the securing portion of the rotary member, and engaging with the cylindrical body such that the locking mechanism is rotatable relative to the cylindrical body.

2. The multi-section hinge mechanism as claimed in claim 1, wherein the securing portion comprises a crosshead, the rotary member defines a through hole running through the disk and the crosshead, a part of the shaft portion is received in the through hole of the rotary member, and the locking projection is engaged with the crosshead.

3. The multi-section hinge mechanism as claimed in claim 2, wherein the crosshead includes a plurality of jaws spaced apart from each other and defining at least one first receiving space therebetween, and the locking projection is received and locked in the at least one first receiving space.

4. The multi-section hinge mechanism as claimed in claim 3, wherein the plurality of jaws includes a first jaw, a second jaw and a third jaw, a first convex stage is provided adjacent the second jaw and a second convex stage is provided adjacent the third jaw, a second receiving space is defined between the first convex stage and the second convex stage, and the elastic arm is received and locked In the second receiving space.

5. The multi-section hinge mechanism as claimed in claim 4, wherein the through hole of the rotary member comprises a round hole, and an arc hole communicating with the second receiving space.

6. The multi-section hinge mechanism as claimed in claim 5, wherein the elastic arm includes a connecting portion, an elastic portion and a bent portion, at least part of the elastic portion is received in the arc hole, and the connecting portion is received in the second receiving space.

7. The multi-section hinge mechanism as claimed in claim 6, wherein the locking mechanism comprises a flange, which is connected with the shaft portion.

8. A camera rotating mechanism for a foldable electronic device, comprising:
 a hollow fastener including partly closed end. the partly closed end defining an opening, a locking means being provided around the opening; and
 a multi-section hinge mechanism comprising:
  a rotary member including a disk and a securing portion integrally formed with the disk, the securing portion being a crosshead, the rotary member defining a through hole running through the disk and the crosshead;
  a connecting shaft comprising a shaft portion having a surface and first and second ends, a cantilevered elastic arm having an attaching portion protruding from the surface at one end of the shaft portion, and a locking mechanism formed on the shaft portion, the locking mechanism comprising an arcuate projection and a locking projection, the arcuate projection being formed on the shaft portion, the locking projection being formed on the arcuate projection, a part of the shaft portion being received in the through hole of the rotary member, and the locking projection being securely engaged with the crosshead; and
  a hollow cylindrical body defining a plurality of grooves in an inner wall thereof and a hole therethrough, the shaft portion engaging in the hole and being rotatable therein, the elastic arm rotatable with the shaft portion and engaging in one of the grooves;
  wherein the locking mechanism is configured for securely engaging with the securing portion of the rotary member, and engaging with the cylindrical body such that the locking mechanism is rotatable relative to the cylindrical body, and the securing portion of the rotary member extends through the opening of the fastener and engages with the locking means of the fastener.

9. The camera rotating mechanism as claimed in claim 8, wherein the crosshead includes a plurality of jaws spaced from each other such that at least one first receiving space and a second receiving space are defined between a plurality of the plurality of jaws, and the locking projection is received and locked in the first receiving space.

10. The camera rotating mechanism as claimed in claim 9, wherein the elastic arm comprises a connecting portion, an elastic portion and a bent portion, the connecting portion is received in the second receiving space, the through hole of the rotary member comprises a round hole, and an arc hole communicating with the second receiving space, and at least part of the elastic portion is received in the arc hole.

11. A multi-section hinge mechanism comprising:
 a rotary member comprising a disk and a securing portion integrally formed with the disk, the securing portion comprising a crosshead, the rotary member defining a through hole running through the disk and the crosshead;
 a connecting assembly comprising a shaft portion, an elastic body provided on the shaft portion, and a locking projection provided on the shaft portion, a part of the shaft portion being received in the through hole of the rotary member, the locking projection of the shaft portion of the connecting assembly being securely engaged with the crosshead of the securing portion of the rotary member; and
 a hollow cylindrical body comprising a bottom portion and defining a plurality of grooves in an inner wall thereof, the bottom portion defining a hole in which the shaft portion is rotatably received, the elastic body engaging in one of the grooves of the cylindrical body.

12. The multi-section hinge mechanism as claimed in claim 11, wherein the crosshead includes a plurality of jaws spaced apart from each other and defining at least one first receiving space therebetween, and the locking projection is received and locked in the at least one first receiving space.

13. The multi-section hinge mechanism as claimed in claim 12, wherein the elastic body comprises an elastic arm extending from the shaft portion and engaging in one of the grooves of the cylindrical body.

14. The multi-section hinge mechanism as claimed in claim 13, wherein the plurality of jaws includes a first jaw, a second jaw and a third jaw, a first convex stage is provided adjacent the second jaw and a second convex stage is provided adjacent the third jaw, a second receiving space is defined between the first convex stage and the second convex stage, and the elastic arm is received and locked In the second receiving space.

* * * * *